United States Patent
Kano et al.

(10) Patent No.: US 11,145,891 B2
(45) Date of Patent: Oct. 12, 2021

(54) LITHIUM METAL SECONDARY BATTERY AND METHOD FOR PRODUCING THE SAME

(71) Applicant: Panasonic Intellectual Property Management Co., Ltd., Osaka (JP)

(72) Inventors: Akira Kano, Osaka (JP); Kiyohiro Isii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 16/298,134

(22) Filed: Mar. 11, 2019

(65) Prior Publication Data
US 2019/0326626 A1    Oct. 24, 2019

(30) Foreign Application Priority Data

Apr. 24, 2018 (JP) .............................. JP2018-083470
Nov. 9, 2018 (JP) .............................. JP2018-211744

(51) Int. Cl.
*H01M 10/0525* (2010.01)
*H01M 10/0587* (2010.01)

(52) U.S. Cl.
CPC ... *H01M 10/0525* (2013.01); *H01M 10/0587* (2013.01)

(58) Field of Classification Search
CPC ......... H01M 10/0525; H01M 10/0587; H01M 2010/4292; H01M 4/382; H01M 10/052; H01M 4/134; H01M 4/131; H01M 4/136; Y02E 60/10
See application file for complete search history.

(56) References Cited

U.S. PATENT DOCUMENTS

2002/0081485 A1* 6/2002 Takekawa ......... H01M 10/0525
429/60
2015/0280212 A1 10/2015 Son et al.

FOREIGN PATENT DOCUMENTS

JP  2001-243957  9/2001
JP  2016-527680  9/2016

* cited by examiner

*Primary Examiner* — Cynthia K Walls
(74) *Attorney, Agent, or Firm* — McDermott Will and Emery LLP (57) ABSTRACT

A lithium metal secondary battery includes a positive electrode, a negative electrode, a separator, and a nonaqueous electrolyte. The positive electrode and the negative electrode are wound to form an electrode group. The positive and negative electrodes face each other with the separator between the positive and negative electrodes. The electrode group has a space for accommodating at least part of the nonaqueous electrolyte when fully discharged. X and Y satisfy $1.00 \leq X/Y < 1.20$, where X is a calculated thickness of the lithium metal which is calculated from design capacity per unit area of the positive electrode, and Y is a virtual thickness of the space when the space is assumed to be formed only between the negative electrode and the separator.

3 Claims, 5 Drawing Sheets

LITHIUM METAL SECONDARY BATTERY AND METHOD FOR PRODUCING THE SAME

BACKGROUND

1. Technical Field

The present disclosure relates to a lithium metal secondary battery using lithium metal as negative electrode active material.

2. Description of the Related Art

In recent years, nonaqueous electrolyte secondary batteries are widely used, for example, in information and communication technology (ICT), such as personal computers and smart phones, cars, and power storage. Nonaqueous electrolyte secondary batteries used for such purposes are required to have further higher capacities. As high-capacity nonaqueous electrolyte secondary batteries, lithium-ion batteries are known. An increase in the capacity of a lithium-ion battery can be achieved by, for example, using a combination of graphite and an alloy active material, such as a silicon (Si) compound, as the negative electrode active material. However, the increase in the capacity of a lithium-ion battery is reaching the limit.

As a high-capacity nonaqueous electrolyte secondary battery having a capacity higher than that of a lithium-ion battery, a lithium metal secondary battery using lithium metal in the negative electrode is promising (for example, Japanese Unexamined Patent Application Publication Nos. 2001-243957 and 2016-527680).

SUMMARY

One non-limiting and exemplary embodiment provides a lithium metal secondary battery having improved charge/discharge efficiency and charge/discharge cycle characteristics.

In one general aspect, the techniques disclosed here feature a lithium metal secondary battery comprising a positive electrode, a negative electrode, a separator disposed between the positive electrode and the negative electrode, and a nonaqueous electrolyte. The positive electrode includes a positive electrode active material that performs a lithium-ion insertion reaction during discharging and that performs a lithium-ion extraction reaction during charging. The negative electrode performs a reaction in which lithium metal is deposited during the charging and performs a reaction in which lithium metal is dissolved during the discharging. The positive electrode and the negative electrode are wound to form an electrode group. The positive and negative electrodes face each other with the separator between the positive and negative electrodes. The electrode group has a space for accommodating at least part of the nonaqueous electrolyte when fully discharged. X and Y satisfy $1.00 \leq X/Y < 1.20$, where X is a calculated thickness of the lithium metal which is calculated from design capacity per unit area of the positive electrode, and Y is a virtual thickness of the space when the space is assumed to be formed only between the negative electrode and the separator.

It should be noted that general or specific embodiments of the present disclosure may be implemented as a battery, an apparatus, a system, a method, or any combination thereof.

According to a lithium metal secondary battery of an embodiment of the present disclosure, the charge/discharge efficiency and the charge/discharge cycle characteristics can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The lithium metal secondary battery according to the present disclosure includes a positive electrode, a negative electrode, a separator disposed between the positive electrode and the negative electrode, and a nonaqueous electrolyte. The positive electrode includes a positive electrode active material that performs a lithium-ion insertion reaction during discharging and that performs a lithium-ion extraction reaction during charging. The negative electrode performs a reaction in which lithium metal is deposited during charging and performs a reaction in which lithium metal is dissolved during discharging. The positive electrode and the negative electrode are wound such that they face each other with the separator therebetween to form an electrode group.

In the lithium metal secondary battery, in the process of dissolution and deposition of lithium metal during charging and discharging, generation of dendrites of the lithium metal on the negative electrode and a reaction between the lithium metal and the electrolyte occur. Accordingly, lithium metal secondary batteries tend to have lower charge/discharge efficiency and worse charge/discharge cycle characteristics compared to lithium-ion batteries.

First Embodiment

Figure 1:
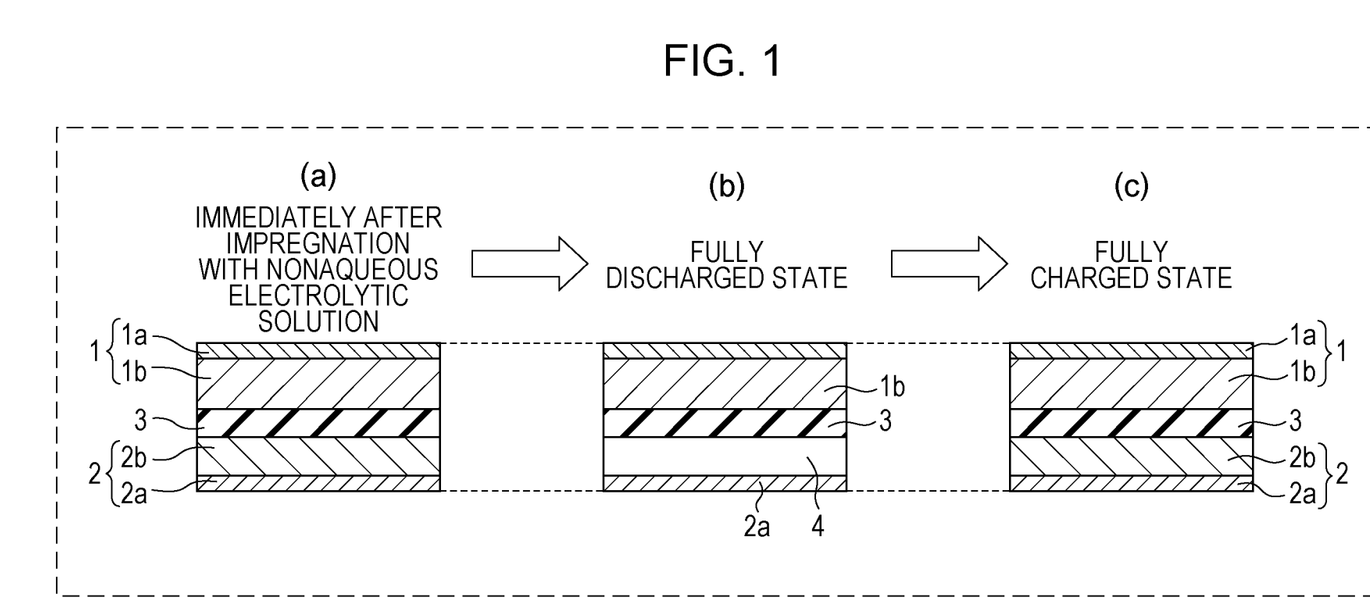
FIG. 1 includes schematic cross-sectional views of a part of the electrode group of a lithium metal secondary battery according to an embodiment of the present disclosure and shows (a) a state immediately after impregnation with a nonaqueous electrolytic solution, (b) a fully discharged state, and (c) a fully charged state.

FIG. 1 includes schematic cross-sectional views of a part of an electrode group formed according to First Embodiment of the present disclosure in each state after impregnation with a nonaqueous electrolytic solution (hereinafter, may also be simply referred to as electrolytic solution) as a nonaqueous electrolyte. In FIG. 1, Part (a) shows a state immediately after impregnation with the electrolytic solution, Part (b) shows a fully discharged state, and Part (c) shows a fully charged state.

As shown in Part (a) of FIG. 1, immediately after impregnation with an electrolytic solution, the positive electrode 1 in the state in which lithium ions are extracted and the negative electrode 2 in the state in which lithium metal 2b is attached to a negative electrode current collector 2a are stacked with a separator 3 therebetween. The positive electrode 1 includes a positive electrode current collector 1a and a positive electrode mixture layer 1b formed on the positive electrode current collector 1a. Subsequently, as shown in Part (b) of FIG. 1, lithium ions are inserted into the positive electrode 1 by discharging. At the same time, the lithium metal 2b present on the negative electrode current collector 2a elutes from the negative electrode 2. Consequently, at least part of the electrolytic solution is accommodated in the space 4 (specifically, the portion between the negative electrode current collector 2a and separator 3) which was occupied by the lithium metal 2b on the negative electrode current collector 2a. In the fully discharged state, substantially no lithium metal 2b may be present in the space 4, or part of the lithium metal 2b may be left. Subsequently, as shown in Part (c) of FIG. 1, lithium ions are extracted from the positive electrode 1 by charging. At the same time, in the negative electrode 2, lithium metal 2b is deposited on the negative electrode current collector 2a.

Since the lithium metal 2b is deposited in the space 4 that was formed in the state shown in (b) of FIG. 1, it is perceived that the volume of the lithium metal 2b does not largely exceed the volume of the space 4. The thickness of the deposited lithium metal 2b can be approximately equal to the thickness of the space 4 between the negative electrode current collector 2a and the separator 3. From the above, the electrode group can be prevented from largely expanding by deposition of the lithium metal 2b.

Figure 2:
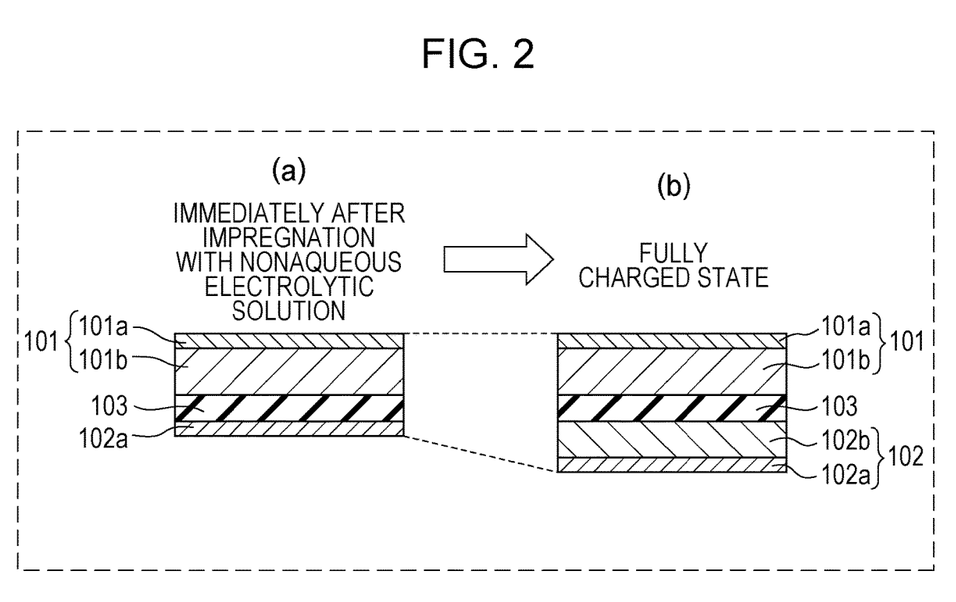
FIG. 2 includes schematic cross-sectional views of a part of the electrode group of a lithium metal secondary battery of a comparative example and shows (a) a state immediately after impregnation with an electrolytic solution and (b) a fully charged state.

FIG. 2 includes schematic cross-sectional views of a part of an electrode group formed in a comparative example in each state after impregnation with an electrolytic solution. In FIG. 2, Part (a) shows a state immediately after impregnation with the electrolytic solution and Part (b) shows a fully charged state.

As shown in Part (a) of FIG. 2, immediately after impregnation with an electrolytic solution, a positive electrode 101 in a lithium ion inserted state and a negative electrode current collector 102a are stacked with a separator 103 therebetween. Subsequently, as shown in Part (b) of FIG. 2, the positive electrode 101 becomes the lithium ion-extracted state by charging. At the same time, in the negative electrode 102, lithium metal 102b is deposited on the negative electrode current collector 102a. Since the lithium metal 102b is deposited between the negative electrode current collector 102a and the separator 103, the electrode group expands.

Here, $1.00 \leq X/Y < 1.20$ is satisfied. X is the calculated thickness of lithium metal 2b which is calculated from the design capacity per unit area of the positive electrode 1. Y is the virtual thickness of the space 4 when the space 4 is assumed to be formed only between the negative electrode 2 and the separator 3.

In the present disclosure, the term "design capacity" refers to the discharging capacity from the fully charged state with an upper limit voltage to the fully discharged state with a lower limit voltage. Here, the upper limit voltage and the lower limit voltage are values determined by considering cycle characteristics. For example, the upper limit voltage and the lower limit voltage are determined for ensuring a predetermined capacity retention (e.g., 80%) at a predetermined charge/discharge frequency (e.g., 500 times). The fully discharged state is a state obtained by discharging until a state of charge (SOC) of 0.05×C or less, where C denotes the rated capacity of the battery. The fully charged state is a state obtained by charging until an SOC of 0.98×C or more. For example, the value calculated from the theoretical capacity and the total mass of the active material contained in an electrode can be regarded as the design capacity. Here, the term "theoretical capacity" refers to the maximum amount of electricity (also referred to as capacity density) that can be stored by a unit mass of active material in an assumed electrochemical reaction. For example, when a positive electrode active material has a layered rock salt structure and is represented by a compositional formula $LiMO_2$ (where, M denotes a metal other than Li, and 90 mol % or more of M is a transition metal), the maximum amount of electricity of the lithium ions that can be electrochemically released by a unit mass of active material is the theoretical capacity (i.e., capacity density). In addition, in the present disclosure, the term "design capacity per unit area of positive electrode" refers to the design capacity per unit area of a region in the positive electrode supporting a positive electrode active material and facing the negative electrode. Hereinafter, when a space is assumed to be formed only between the negative electrode and the separator, the space is referred to as "virtual space", and the virtual thickness of the virtual space is referred to as "thickness of virtual space" in some cases.

The value X/Y may be less than 1.15, further may be less than 1.10. When the value X/Y is less than 1.20, the thickness of the lithium metal 2b depositing on the negative electrode current collector 2a can be controlled from becoming larger than the thickness Y of the virtual space 4 between the negative electrode 2 and the separator 3. In such a case, the deposited lithium metal 2b is accommodated in the space 4 even in the fully charged state, and expansion of the electrode group therefore can be controlled.

The thickness X can be specifically calculated using, for example, the design capacity per unit area of the positive electrode 1 (i.e., in the positive electrode 1, the design capacity per unit area of a region supporting a positive electrode active material and facing the negative electrode 2), the theoretical capacity (3860 mAh/g) of the lithium metal 2b, and the density (0.534 g/cm$^3$) of the lithium metal 2b. The thickness X is specifically calculated as follows: (1) The mass of the lithium metal 2b corresponding to the design capacity per unit area of the positive electrode 1 is determined from the theoretical capacity of the lithium metal 2b. Subsequently, (2) the thickness of the lithium metal 2b per unit area of the positive electrode 1 is determined from the mass and the density of the lithium metal 2b, based on X=design capacity per unit area of the positive electrode/(theoretical capacity of the lithium metal×density of the lithium metal).

The thickness Y of the virtual space 4 is specifically the space formed between one surface of the negative electrode 2 and the separator 3 facing the surface when the wound lithium metal secondary battery is completely discharged. The thickness of this space 4 can be calculated, for example, from an image of a cross-section of the positive electrode 1 of a fully discharged lithium metal secondary battery. The image of a cross-section of the positive electrode 1 can be obtained by, for example, computed tomography imaging using X-ray (hereinafter, also referred to as X-ray CT measurement), but is not limited to that of this method.

A procedure calculating the thickness Y of a virtual space using a cross-sectional image of a positive electrode obtained by X-ray CT measurement will now be described. Since it is difficult to obtain cross-sectional images of the negative electrode and the separator by X-ray CT measurement, a wound lithium metal secondary battery is disassembled after discharging and is subjected to the measurement. The methods for measuring the length and thickness shown below are not particularly limited as long as they are methods prescribed by the Japanese Industrial Standard, for example. As the measuring method, for example, a scale, a vernier caliper, a micrometer, or a laser microscope can be used.

Second Embodiment

Figure 3:
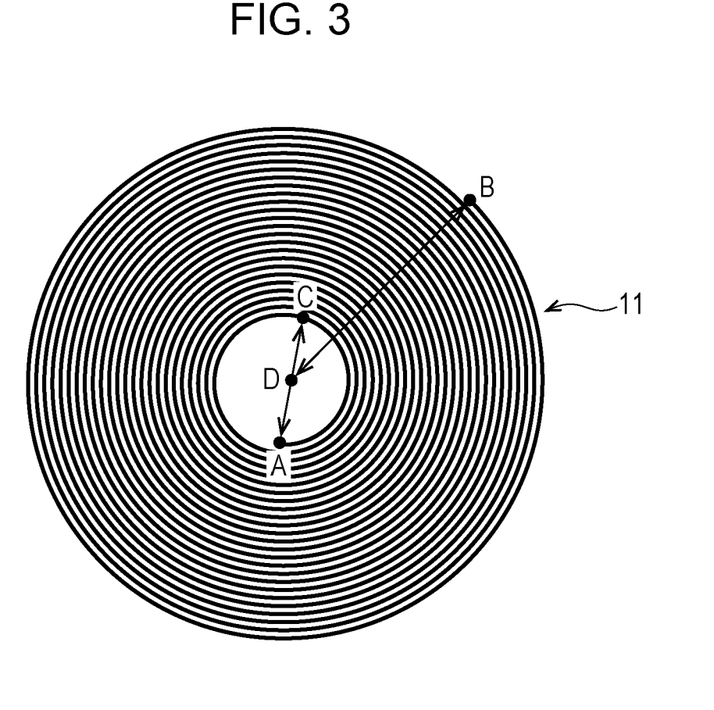
FIG. 3 is a diagram showing a positive electrode obtained by upper X-ray CT measurement of a lithium metal secondary battery at a fully discharged state according to an embodiment of the present disclosure.

FIG. 3 is a transverse section image of the positive electrode 11 of a fully discharged lithium metal secondary battery obtained by X-ray CT measurement. As the positive electrode 11, the negative electrode, the separator, and the nonaqueous electrolyte of Second Embodiment, the positive electrode 1, the negative electrode 2, the separator 3, and the nonaqueous electrolyte of First Embodiment described above can be used. In the image shown in FIG. 3, the start point of the inner circumference of the wound positive electrode 11 is denoted as point A, the end point of the outer circumference of the positive electrode 11 is denoted as point B, the point where the distance from the point A is the maximum in the first round on the inner circumferential side of the positive electrode 11 is denoted as point C, and the middle point between the point A and the point C is denoted as point D. The distance between the point A and the point C is denoted as I, and the distance between the point B and the point D is denoted as L. In the transverse section, the area Sd of the electrode group when fully discharged is defined by the expression: $Sd = \pi \times L \times L - \pi \times (I \times 0.5) \times (I \times 0.5)$.

In the transverse section, when the length of the positive electrode is denoted as Lp, the thickness of the positive electrode is denoted as dp, the thickness of the negative electrode at the fully discharged state is denoted as dn, and the thickness of the separator is denoted as ds, the total area sd of the transverse sections of the positive electrode, the negative electrode, and the separator when fully discharged is defined by the expression: $sd = Lp \times (dp + dn + 2ds)$. When the negative electrode does not substantially contain lithium metal at the fully discharged state, the thickness dn of the negative electrode is the thickness of the negative electrode current collector.

The space area S is defined by the areas Sd and sd as follows: $S = Sd - sd$. Accordingly, the thickness Y can be defined by the expression: $Y = (S/Lp) \times 0.5$. The thickness Y is the thickness of the virtual space when one surface of the positive electrode faces one surface of the negative electrode with the separator therebetween.

Actual positive electrode and negative electrode each have a coated portion supporting an active material on the current collector and an uncoated portion not supporting the active material. However, the uncoated portion is, for example, about 0.5% of the length Lp of the positive electrode, which is a negligible level in calculation of the thickness Y. For example, when the uncoated portion is not provided in the middle of the positive electrode but is formed at an end portion of the current collector, the influence of the uncoated portion is substantially 0%.

The fully discharged state of the lithium metal secondary battery according to the present disclosure is a state obtained by discharging until a state of charge (SOC) of $0.05 \times C$ or less, where C denotes the rated capacity of the battery, for example, a state obtained by discharging until the lower limit voltage at a constant current of $0.05 \times C$. The lower limit voltage is 2.5 V, for example.

In contrast, the fully charged state of the lithium metal secondary battery according to the present disclosure is a state obtained by charging until an SOC of $0.98 \times C$ or more, for example, a state obtained by charging until the upper limit voltage at a constant current of $0.05 \times C$ and then charging until a current of $0.02 \times C$ at a constant voltage of the upper limit voltage. The upper limit voltage is, for example, 4.3 V.

However, the conditions for the charge/discharge system, such as the current, voltage, and lower limit voltage during discharging, the current, voltage, and upper limit voltage during charging, and constant current and constant voltage, are not limited to those disclosed in the present specification. Since these conditions are determined depending on the specifications of the module including the lithium metal secondary battery and the system combined with the module, the conditions may be set according to these specifications.

In one aspect of the present disclosure, the ratio of the design capacity $C_n$ of the negative electrode to the design capacity $C_p$ of the positive electrode, $C_n/C_p$, may satisfy $1.0 < C_n/C_p < 4.0$. For example, the theoretical capacity of lithium cobalt oxide as the positive electrode active material is 274 (mAh/g), the substantial capacity when cycle characteristics etc. are taken into consideration is 150 (mAh/g), and the design capacity of the positive electrode is $150 \times M_p$ (mAh) when the total amount of the positive electrode active material supported by the positive electrode current collector is $M_p$ (g). The theoretical capacity of lithium metal as the negative electrode active material is 3860 (mAh/g), and when the amount of lithium metal contained in the negative electrodes is $M_n$ (g), the design capacity of the negative electrode corresponding to the lithium metal is $3860 \times M_n$ (mAh). The ratio $C_n/C_p$ may be higher than 1.1 and further may be higher than 1.2. The ratio $C_n/C_p$ may be less than 2.0 and further may be less than 1.5. When the ratio $C_n/C_p$ is set to be higher than 1.0, the cycle characteristics of the lithium metal secondary battery can be readily improved. When the ratio $C_n/C_p$ is set to be less than 4.0, an appropriate capacity as a lithium metal secondary battery can be readily secured. When the negative electrode at the fully discharged state is substantially composed of only the current collector, the ratio $C_n/C_p$ may be always considered to be 1.

In view of the above, the method for producing the lithium metal secondary battery according to the present disclosure includes (1) a step of preparing a positive electrode containing a positive electrode active material that performs a lithium-ion insertion reaction during discharging and performs a lithium-ion extraction reaction during charging and being in a lithium ion-extracted state; (2) a step of preparing a negative electrode containing lithium metal; (3) a step of forming an electrode group by winding the positive electrode and the negative electrode such that they face each other with a separator therebetween; and (4) a step of assembling a battery by accommodating the formed electrode group in an outer packaging and pouring an electrolytic solution into the outer packaging accommodating the electrode group. This production method may include a step of discharging the assembled battery after the step (4). The amount of lithium ions extracted from the positive electrode and the amount of lithium metal contained in the negative electrode are controlled such that a space is formed in the electrode group when fully discharged. That is, the electrode group is formed such that the electrode group has a space for accommodating at least part of the nonaqueous electrolyte when fully discharged. The thickness X of lithium metal calculated from the design capacity per unit area of the positive electrode and the virtual thickness Y of the space when the space is assumed to be formed only between the negative electrode and the separator are controlled so as to satisfy $1.00 \leq X/Y < 1.20$. Such control allows the lithium metal deposited on the negative electrode current collector during charging to be accommodated in the space formed in the electrode group. Consequently, the expansion of the electrode group by deposition of lithium metal can be controlled.

Third Embodiment

A specific embodiment of the present disclosure will now be described, but the following embodiment is merely a part of specific examples of the present disclosure and does not limit the technical scope of the present disclosure. The configurations of First and Second Embodiments can be applied to Third Embodiment.

Nonaqueous Electrolyte

The nonaqueous electrolyte includes a lithium salt. The nonaqueous electrolyte may be in a liquid form, in a gel form, or in a mixture of gel and liquid forms. A liquid nonaqueous electrolyte (that is, nonaqueous electrolytic solution) includes a lithium salt and a nonaqueous solvent for dissolving the lithium salt. A gel nonaqueous electrolyte includes, for example, a lithium salt and a matrix polymer or a lithium salt, a nonaqueous solvent, and a matrix polymer. The matrix polymer is, for example, a material that absorbs a nonaqueous solvent and thereby gels, and examples thereof include fluororesins, acrylic resins, and polyether resins.

Lithium Salt

Examples of the lithium salt include $LiBF_4$, $LiClO_4$, $LiPF_6$ (lithium hexafluorophosphate), $LiAsF_6$, $LiSbF_6$, $LiAlCl_4$, LiSCN, $LiCF_3SO_3$, $LiCF_3CO_2$, imides such as $LiN(SO_2CF_3)_2$ (lithium bis(trifluoromethylsulfonyl)imide) and $LiN(C_mF_{2m+1}SO_2)_x(C_nF_{2n+1}SO_2)_y$ (where m and n each independently denote an integer of 0 or 1 or more, x and y each independently denote 0, 1, or 2, and x+y=2 is satisfied), and lithium salts having oxalate complexes as anions. The lithium salt may be $LiPF_6$, $LiN(SO_2CF_3)_2$, $LiN(SO_2C_2F_5)_2$ (lithium bis(perfluoroethylsulfonyl)imide), $LiN(SO_2F)_2$, or a lithium salt having an oxalate complex as an anion, because generation of dendrites is readily controlled. These lithium salts are used alone or in combination of two or more thereof.

The lithium salt having an oxalate complex as an anion may contain boron (B) or phosphorus (P). Examples of the lithium salt include lithium bis(oxalate) borate (LiBOB), $LiBF_2(C_2O_4)$, $LiPF_4(C_2O_4)$, and $LiPF_2(C_2O_4)_2$. The lithium salt having an oxalate complex as an anion may be LiBOB or $LiBF_2(C_2O_4)$.

Nonaqueous Solvent

Examples of the nonaqueous solvent include esters, ethers, nitriles (e.g., acetonitrile), and amides (e.g., dimethylformamide). These solvents are used alone or in combination of two or more thereof. The nonaqueous solvent may be a halogen-substituted product in which at least part of hydrogen is substituted with a halogen atom such as fluorine.

Examples of the ester include cyclic carbonates, such as ethylene carbonate (EC), propylene carbonate (PC), butylene carbonate, and fluoroethylene carbonate (FEC); chain carbonate, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates, such as γ-butyrolactone and γ-valerolactone; and chain carboxylates, such as methyl acetate, ethyl acetate, propyl acetate, methyl propionate (MP), ethyl propionate, and methyl fluoropropionate (FMP).

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineol, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The nonaqueous electrolyte may include an additive. Generation of dendrites is readily controlled by forming a coating film derived from the additive on the negative electrode. Examples of the additive include vinylene carbonate (VC), fluoroethylene carbonate (FEC), and vinyl ethyl carbonate (VEC). These additives are used alone or in combination of two or more thereof.

Negative Electrode

The negative electrode is an electrode depositing lithium metal during charging and may contain minor components in addition to lithium. Lithium metal mainly deposits on the surface of the negative electrode facing the positive electrode. The depositing lithium metal is derived from the lithium ions in the nonaqueous electrolyte released from the positive electrode and is dissolved again in the nonaqueous electrolyte and inserted into the positive electrode by discharging.

In the embodiment, lithium metal is formed on the negative electrode current collector in advance. The mass of the previously formed lithium metal may be higher than the mass of lithium metal corresponding to the designed capacity of the positive electrode facing the lithium metal. In addition, the area of the previously formed lithium metal may be larger than the area of the positive electrode facing the lithium metal. The lithium metal may be formed on the negative electrode current collector by any method. Examples of the method for forming lithium metal on the negative electrode current collector include (1) a method in which lithium metal rolled by a roll press is transferred on a negative electrode current collector and (2) a method in which lithium metal is vapor-deposited on a negative electrode current collector.

The negative electrode current collector is constituted of an electrically conductive material other than lithium metal and lithium alloys. The negative electrode current collector may be constituted of a metal material that does not react with lithium metal (that is, does not form an alloy or an intermetallic compound with lithium metal). Examples of such metal materials include copper (Cu), nickel (Ni), iron (Fe), and stainless steel. The metal material may be Cu from the viewpoint of conductive properties.

Examples of the form of the negative electrode current collector include porous and non-porous sheets (i.e., for example, foil and film). When copper foil is used as the negative electrode current collector, Cu may be the main component. That is, Cu may account for 50 mass % or more of the copper foil. The copper foil may be substantially constituted of Cu only. The thickness of the negative electrode current collector is not particularly limited and is, for example, 5 to 20 μm.

Positive Electrode

The positive electrode includes, for example, a positive electrode current collector and a positive electrode mixture layer formed on the positive electrode current collector. The positive electrode mixture layer includes, for example, a positive electrode active material, a conductive material, and a binder. The positive electrode mixture layer may be formed on both surfaces of the positive electrode current collector. The positive electrode is prepared by, for example, applying a positive electrode mixture slurry containing a positive electrode active material, a conductive material, and a binder to the both surfaces of the positive electrode current collector, and drying and then rolling the coated film.

The positive electrode active material is a material that inserts and extracts lithium ions. The positive electrode active material desirably has at least one crystal structure selected from the group consisting of a layered rock salt structure, a spinel structure, and an olivine structure. Examples of the positive electrode active material include lithium-containing transition metal oxides, transition metal fluorides, polyanion compounds, fluorinated polyanion compounds, and transition metal sulfides. The positive electrode active material is more desirably a lithium-containing transition metal oxide because the manufacturing cost is low and the average discharge voltage is high.

Examples of the metal element constituting the lithium-containing transition metal oxide include Mg, Al, calcium (Ca), scandium (Sc), Ti, vanadium (V), chromium (Cr), manganese (Mn), Fe, cobalt (Co), Ni, Cu, zinc (Zn), Ga, Ge, yttrium (Y), Zr, tin (Sn), antimony (Sb), tungsten (W), lead (Pb), and bismuth (Bi). These metal elements may be, for example, Co, Ni, Mn, and Al. These metal elements are used alone or in combination of two or more thereof.

Examples of the conductive material include carbon materials, such as carbon black (CB), acetylene black (AB), Ketjen black (KB), carbon nanotubes (CNT), and graphite. These materials are used alone or in combination of two or more thereof.

Examples of the binder include fluororesins, such as polytetrafluoroethylene (PTFE) and polyfluorinated vinylidene (PVdF); polyacrylonitrile (PAN); polyimide resins; acrylic resins; and polyolefin resins. These binders are used alone or in combination of two or more thereof.

Examples of the material of the positive electrode current collector include metal materials, such as Al, stainless steel, Ti, and alloys thereof. The material may be Al or an Al alloy because they are inexpensive and easily formed into thin film. Examples of the form of the positive electrode current collector include porous and non-porous sheets. The sheet of a metal material is, for example, metal foil (i.e., metal film) or metal mesh. A carbon material, such as carbon, may be applied onto a surface of the positive electrode current collector. In such a case, it can be expected, for example, a reduction in resistance value, provision of a catalytic effect, and strengthening of the bond between the positive electrode mixture layer and the positive electrode current collector.

In the embodiment, the method includes a step of extracting lithium from the positive electrode constituted as described above. Examples of the process of the extraction includes an electrochemical method. For example, a positive electrode and a counter electrode on which lithium extracted from the positive electrode deposits are immersed in a bath filled with an electrolytic solution, and a current is applied between the positive electrode and the counter electrode. The extracted amount of lithium may be 50% to 100%, or 70% to 100%, of the design capacity of the positive electrode. The positive electrode constituted as described above and treated for lithium extraction is washed and dried to prepare a lithium-extracted positive electrode.

The positive electrode may be formed after chemical extraction of lithium from a lithium-containing transitional metal compound at the time of synthesis of the positive electrode active material. The extracted amount of lithium may be 50% to 100%, or 70% to 100%, of the design capacity of the positive electrode. The method for preparing the lithium-extracted positive electrode is not limited to these methods. In addition, the positive electrode active material desirably has at least one crystal structure selected from the group consisting of a layered rock salt structure, a spinel structure, and an olivine structure, but is not particularly limited. When the positive electrode active material has a layered rock salt structure and is represented by a compositional formula: $LiMO_2$ (where, M represents a metal other than Li, and 90 mol % or more of M is a transition metal), the molar ratio of the molar amount Mp of Li possessed by the positive electrode at the fully discharged state to the total molar amount Mt of Li possessed by the positive electrode and the negative electrode, Mp/Mt, may be 1.0 or may be less than 1.0.

Separator

As the separator, a porous sheet having ion permeability and insulation properties is used. Examples of the porous sheet include thin film having microporosity, woven fabric, and nonwoven fabric. The material of the separator is not particularly limited and may be, for example, an olefin resin, such as polyethylene, polypropylene, or a copolymer of ethylene and propylene; or cellulose. The separator may be a laminate of porous sheets. For example, the separator may be a laminate of nonwoven fabric formed from cellulose fibers and nonwoven fabric formed from thermoplastic resin fibers or a laminate of polyethylene thin film and polypropylene thin film. A polyamide resin may be applied to a surface of the separator. In such a case, an increase in durability of the separator is expected. A heat resistant layer containing an inorganic filler may be formed in the interface between the separator and the positive electrode and/or in the interface between the separator and the negative electrode.

Lithium Metal Secondary Battery

Figure 4:
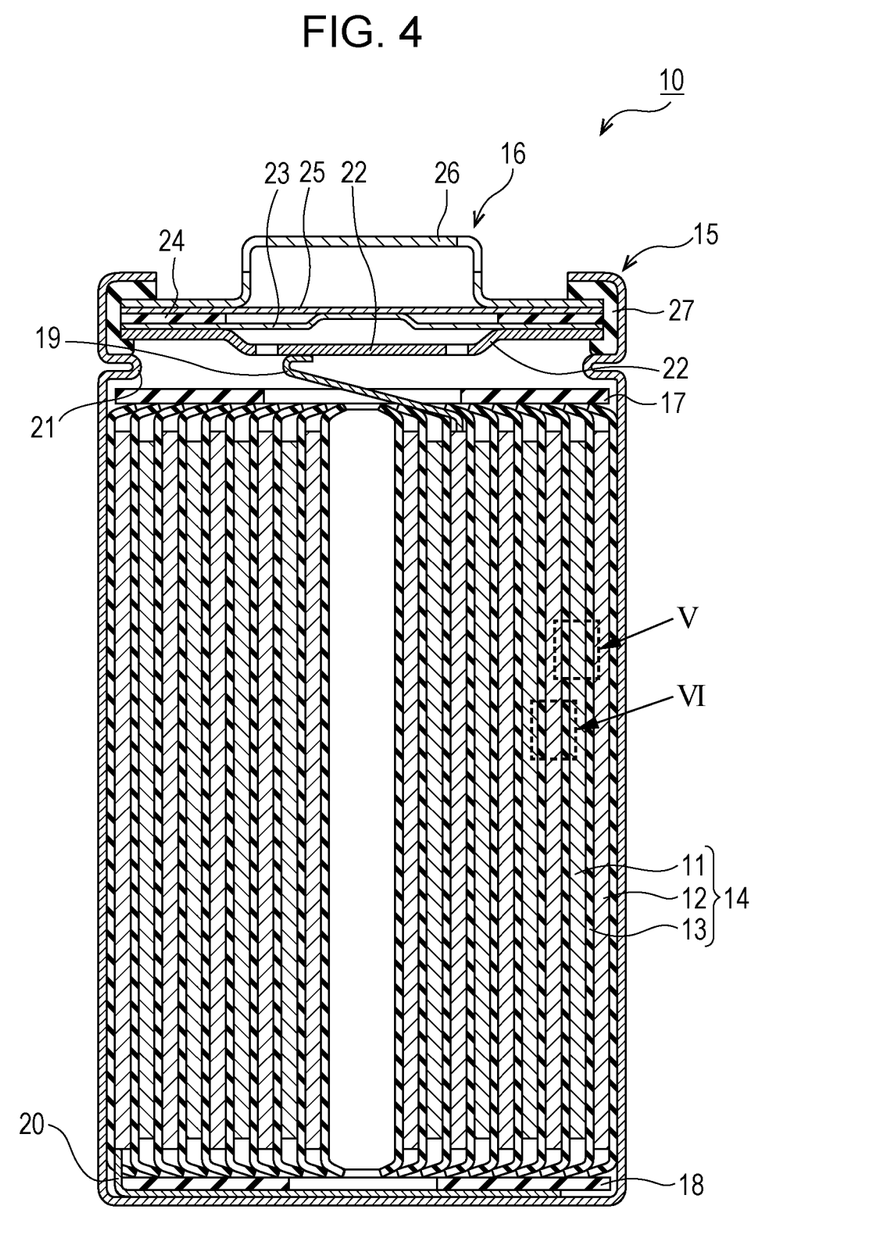
FIG. 4 is a longitudinal cross-sectional view of a lithium metal secondary battery according to an embodiment of the present disclosure.
Figure 5:
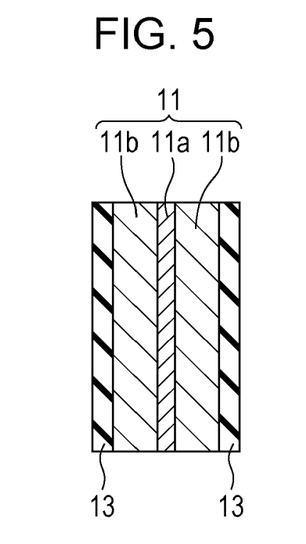
FIG. 5 is a partial cross-sectional view around the positive electrode of the lithium metal secondary battery according to the embodiment of the present disclosure.
Figure 6:
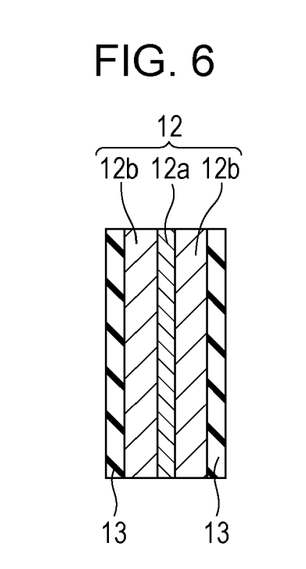
FIG. 6 is a partial cross-sectional view around the negative electrode of the lithium metal secondary battery according to the embodiment of the present disclosure.

The structure of the lithium metal secondary battery according to the embodiment will now be described with reference to the drawings. FIG. 4 is a longitudinal cross-sectional view of the lithium metal secondary battery 10 as an example of the embodiment. FIG. 5 is a cross-sectional view illustrating the configuration of the electrode group on the positive electrode side according to the embodiment. More specifically, FIG. 5 shows the region surrounded by the broken line V in FIG. 4. FIG. 6 is a cross-sectional view illustrating the configuration of the electrode group on the negative electrode side according to the embodiment. More specifically, FIG. 6 shows the region surrounded by the broken line VI in FIG. 4. The positive electrode 1, the negative electrode 2, the separator 3, and the nonaqueous electrolyte of First Embodiment described above can be used as the positive electrode 11, the negative electrode 12, the separator 13, and the nonaqueous electrolyte of the embodiment. In such a case, the configuration in which the positive electrode mixture layer 1b and the separator 3 are disposed respectively on both surfaces of the positive electrode current collector 1a of First Embodiment corresponds to the configuration shown in FIG. 5. The configuration in which the lithium metal 2b and the separator 3 are disposed respectively on both surfaces of the negative electrode current collector 2a of the First Embodiment corresponds to the configuration show in FIG. 6.

In the embodiment, the lithium metal 12b is deposited on the negative electrode current collector 12a of the negative electrode 12 during charging, and the lithium metal 12b is dissolved in the nonaqueous electrolyte (not shown) during discharging.

The lithium metal secondary battery 10 is a cylindrical battery including a metal battery case. The battery case is composed of a case body 15 and a sealing body 16. The battery case accommodates the electrode group 14 and the nonaqueous electrolyte. A gasket 27 is disposed between the case body 15 and the sealing body 16 to guarantee the sealability of the battery case.

The case body 15 is a bottomed cylindrical metal container. The case body 15 has a stepped portion 21 formed by, for example, pressing the side wall from the outside. The stepped portion 21 may be formed annularly along the circumferential direction of the case body 15. In such a case, the sealing body 16 is supported by the upper surface of the stepped portion 21.

The sealing body 16 is formed by stacking a filter 22, a lower valve 23, an insulating member 24, an upper valve 25, and a cap 26 in this order. Each member has, for example, a disk shape or a ring shape. The lower valve 23 and the upper valve 25 are connected to each other at the respective central portions, and the insulating member 24 is interposed between the peripheral portions of the respective valves. The filter 22 and the lower valve 23 are connected to each other at the respective peripheral portions. The upper valve 25 and the cap 26 are connected to each other at the respective peripheral portions. That is, the members excluding the insulating member 24 are electrically connected to one another.

The lower valve 23 is provided with an air hole (not shown). Consequently, when the internal pressure of the battery case is increased by, for example, abnormal heating, the upper valve 25 expands toward the cap 26 side and separates from the lower valve 23. As a result, the electrical connection between the lower valve 23 and the upper valve 25 is disconnected. If the internal pressure is further increased, the upper valve 25 is broken to discharge the gas from the opening (not shown) formed in the cap 26.

The electrode group 14 includes a positive electrode 11, a negative electrode 12, and a separator 13. The positive electrode 11 and the negative electrode 12 are spirally wound with the separator 13 therebetween. The positive electrode 11, the negative electrode 12, and the separator 13 constituting the electrode group 14 each have a band-like shape. In the electrode group 14, the positive electrode 11 and the negative electrode 12 are alternately laminated in the radius direction of the electrode group 14. That is, the longitudinal direction of each electrode is the winding direction, and the width direction of each electrode is the axial direction. Insulation plates 17, 18 are respectively disposed at both ends of the electrode group 14 in the axial direction.

The positive electrode 11 includes a positive electrode current collector 11a and positive electrode mixture layers 11b (see FIG. 5) and is electrically connected to the cap 26 having a function as a positive electrode terminal via a positive electrode lead 19. One end of the positive electrode lead 19 is connected to the positive electrode 11, for example, at around the center in the longitudinal direction. The positive electrode lead 19 extending from the positive electrode 11 passes through a through hole (not shown) formed in the insulation plate 17 and reaches the filter 22. The other end of the positive electrode lead 19 is welded to the surface of the filter 22 on the electrode group 14 side. The negative electrode 12 includes a negative electrode current collector 12a and lithium metal 12b (see FIG. 6) and is electrically connected to the case body 15 having a function as a negative electrode terminal via a negative electrode lead 20. One end of the negative electrode lead 20 is connected to, for example, an end of the negative electrode 12 in the longitudinal direction, and the other end is welded to the inner surface of the bottom of the case body 15.

The present disclosure will now be further specifically described based on examples. However, the following examples do not limit the present disclosure. In the present examples, a battery in which a wound electrode group having a circular cross-section is laminated and sealed was used for verification of a cylindrical lithium metal secondary battery having a structure as shown in FIG. 4.

Example 1

(1) Production of Positive Electrode

A lithium-containing transition metal oxide containing Li, Ni, Co, and Al (NCA: an example of positive electrode active material), an acetylene black (AB: an example of conductive material), and polyfluorinated vinylidene (PVdF: an example of binder) were mixed at a mass ratio, NCA:AB:PVdF, of 95:2.5:2.5, and an appropriate amount of N-methyl-2-pyrrolidone (NMP) was further added to the mixture, followed by stirring to prepare a positive electrode mixture slurry. Subsequently, the resulting positive electrode mixture slurry was applied to both surfaces of aluminum foil (an example of positive electrode current collector) and was then dried. The resulting coating films of the positive electrode mixture were rolled with a roller to produce a positive electrode including positive electrode mixture layers on both surfaces of the positive electrode current collector.

Here, the amount of the positive electrode active material was adjusted such that the discharging capacity per unit area obtained by discharging from the fully charged state to the fully discharged state was 5 mAh/cm$^2$. That is, the design capacity per unit area of the positive electrode was defined as 5 mAh/cm$^2$. The theoretical thickness X of the lithium metal deposited on the negative electrode calculated from the design capacity per unit area of the positive electrode using the theoretical capacity of 3860 mAh/g and the density of 0.534 g/cm$^3$ of the lithium metal was 24.3 μm.

The produced positive electrode was arranged so as to face electrolytic copper foil with a separator therebetween in an atmosphere with a dew point of −40° C. or less, and they were immersed in a bath containing an electrolytic solution prepared by dissolving LiPF$_6$ at a concentration of 1 mol/L in a solvent mixture of ethylene carbonate (EC) and dimethyl carbonate (DMC) at a volume ratio, EC:DMC, of 3:7. Subsequently, a constant current load is applied between the positive electrode and the electrolytic copper foil for a predetermined time to deposit lithium metal on the electrolytic copper foil and extract lithium from the positive electrode in an amount corresponding to 70% of the design capacity of the positive electrode. Subsequently, the lithium-extracted positive electrode was taken out from the bath containing the electrolytic solution, washed with DMC, dried, and cut into a predetermined electrode size to obtain a positive electrode.

(2) Production of Negative Electrode

Lithium metal rolled into a thickness of 25 μm was transferred to both surfaces of the electrolytic copper foil, and the resulting product was cut into a predetermined electrode size to obtain a negative electrode.

(3) Preparation of Nonaqueous Electrolyte $LiPF_6$ and $LiBF_2(C_2O_4)$ were dissolved at concentrations of 1 mol/L and 0.1 mol/L, respectively, in a solvent mixture of EC and DMC at a volume ratio, EC:DMC, of 3:7 to prepare a liquid nonaqueous electrolyte (i.e., nonaqueous electrolytic solution).

(4) Production of Battery

An Al tab was attached to the positive electrode, and a Ni tab was attached to the negative electrode. The positive electrode and the negative electrode were wound with polyethylene thin film (an example of separator) therebetween so as to give a circular cross section in an inert gas atmosphere to produce an electrode group. The resulting electrode group was accommodated in a bag-like outer packaging formed with a laminate sheet having an Al layer, and the nonaqueous electrolyte was poured in the outer packaging accommodating the electrode group. The outer packaging was then sealed to produce a lithium metal secondary battery A1. The resulting lithium metal secondary battery was fully discharged and was subjected to X-ray CT measurement from the top. The thickness Y of the virtual space when fully discharged was 21.0 μm. The value X/Y obtained by dividing the thickness X of the lithium metal in the above (1) by the thickness Y was 1.16.

Example 2

A lithium metal secondary battery A2 was produced as in Example 1 except that the positive electrode was produced such that the extracted amount of lithium was 80% of the design capacity of the positive electrode. The thickness Y of the virtual space when fully discharged was 21.9 μm. The value X/Y was 1.11.

Example 3

A lithium metal secondary battery A3 was produced as in Example 1 except that the positive electrode was produced such that the extracted amount of lithium was 90% of the design capacity of the positive electrode. The thickness Y of the virtual space when fully discharged was 23.1 μm. The value X/Y was 1.05.

Example 4

A lithium metal secondary battery A4 was produced as in Example 1 except that the positive electrode was produced such that the extracted amount of lithium was 100% of the design capacity of the positive electrode. The thickness Y of the virtual space when fully discharged was 24.0 μm. The value X/Y was 1.01.

Example 5

A lithium metal secondary battery A5 was produced as in Example 1 (extracted amount of lithium: 70%) except that the negative electrode was produced such that the lithium metal had a thickness of 50 μm. The thickness Y of the virtual space when fully discharged was 20.5 μm. The value X/Y was 1.19.

Example 6

A lithium metal secondary battery A6 was produced as in Example 2 (extracted amount of lithium: 80%) except that the negative electrode was produced such that the lithium metal had a thickness of 50 μm. The thickness Y of the virtual space when fully discharged was 22.1 μm. The value X/Y was 1.10.

Example 7

A lithium metal secondary battery A7 was produced as in Example 3 (extracted amount of lithium: 90%) except that the negative electrode was produced such that the lithium metal had a thickness of 50 μm. The thickness Y of the virtual space when fully discharged was 22.9 μm. The value X/Y was 1.06.

Example 8

A lithium metal secondary battery A8 was produced as in Example 4 (extracted amount of lithium: 100%) except that the negative electrode was produced such that the lithium metal had a thickness of 50 μm. The thickness Y of the virtual space when fully discharged was 23.9 μm. The value X/Y was 1.02.

Example 9

A lithium metal secondary battery A9 was produced as in Example 4 (extracted amount of lithium: 100%) except that the negative electrode was produced such that the lithium metal had a thickness of 20 μm. The thickness Y of the virtual space when fully discharged was 21.0 μm. The value X/Y was 1.16.

Comparative Example 1

A lithium metal secondary battery B1 was produced as in Example 1 except that the positive electrode was produced such that the extracted amount of lithium was 60% of the design capacity of the positive electrode. The thickness Y of the virtual space when fully discharged was 19.4 μm. The value X/Y was 1.25.

Comparative Example 2

A lithium metal secondary battery B2 was produced as in Example 1 except that the positive electrode was produced such that the extracted amount of lithium was 50% of the design capacity of the positive electrode. The thickness Y of the virtual space when fully discharged was 18.2 μm. The value X/Y was 1.33.

Comparative Example 3

A lithium metal secondary battery B3 was produced as in Example 5 except that the positive electrode was produced such that the extracted amount of lithium was 60% of the design capacity of the positive electrode. The thickness Y of the virtual space when fully discharged was 19.1 μm. The value X/Y was 1.27.

Comparative Example 4

A lithium metal secondary battery B4 was produced as in Example 5 except that the positive electrode was produced such that the extracted amount of lithium was 50% of the design capacity of the positive electrode. The thickness Y of the virtual space when fully discharged was 17.5 μm. The value X/Y was 1.39.

Example 10

A lithium metal secondary battery A10 was produced as in Example 1 (extracted amount of lithium: 70%) except that the positive electrode was produced by adjusting the amount of the positive electrode active material such that the design capacity per unit area of the positive electrode was 3.6 mAh/cm².

The thickness Y of the virtual space when fully discharged was 15.1 μm. The value X/Y was 1.16. The theoretical thickness X of the lithium metal deposited on the negative electrode calculated from the design capacity per unit area of the positive electrode using the theoretical capacity of 3860 mAh/g and the density of 0.534 g/cm³ of the lithium metal was 17.5 μm.

Example 11

A lithium metal secondary battery A11 was produced as in Example 10 (design capacity per unit area of positive electrode: 3.6 mAh/cm²) except that the positive electrode was produced such that the extracted amount of lithium was 80% of the design capacity of the positive electrode. The thickness Y of the virtual space when fully discharged was 16.2 μm. The value X/Y was 1.08.

Example 12

A lithium metal secondary battery A12 was produced as in Example 10 (design capacity per unit area of positive electrode: 3.6 mAh/cm²) except that the positive electrode was produced such that the extracted amount of lithium was 90% of the design capacity of the positive electrode. The thickness Y of the virtual space when fully discharged was 17.1 μm. The value X/Y was 1.02.

Example 13

A lithium metal secondary battery A13 was produced as in Example 10 (design capacity per unit area of positive electrode: 3.6 mAh/cm²) except that the positive electrode was produced such that the extracted amount of lithium was 100% of the design capacity of the positive electrode. The thickness Y of the virtual space when fully discharged was 17.3 μm. The value X/Y was 1.01.

Comparative Example 5

A lithium metal secondary battery B5 was produced as in Example 10 (design capacity per unit area of positive electrode: 3.6 mAh/cm²) except that the positive electrode was produced such that the extracted amount of lithium was 60% of the design capacity of the positive electrode. The thickness Y of the virtual space when fully discharged was 14.3 The value X/Y was 1.22.

Evaluation

The batteries obtained in Examples 1 to 13 and Comparative Examples 1 to 5 were evaluated for the charge/discharge characteristics by a charge/discharge test. In the charge/discharge test, the batteries were placed in a thermostatic chamber of 25° C. and were charged under the conditions shown below, then paused for 20 minutes, and discharged under the conditions shown below.

Charging

Constant-current charging was performed at a current of 10 mA per square centimeter of the electrode until the battery voltage reached 4.3 V, and constant-voltage charging was then performed at 4.3 V until the current value per square centimeter of the electrode reached 1 mA.

Discharging

Constant-current discharging was performed at a current of 10 mA per square centimeter of the electrode until the battery voltage reached 2.5 V. The charging and discharging described above were defined as one cycle, and a charge/discharge test of 20 cycles was performed.

The value obtained by dividing the discharging capacity of the 20th cycle by the discharging capacity of the first cycle was defined as the capacity retention (%). The number of cycles until internal short circuit occurred in each of the batteries B1 to B5 was verified. Table 1 shows the results of Examples 1 to 9 and Comparative Examples 1 to 4, and Table 2 shows the results of Examples 10 to 13 and Comparative Example 5.

TABLE 1

| Battery | Y (μm) | X/Y | Positive electrode Li-extracted amount (%) | Negative electrode Rolled Li (μm) | Capacity retention of 20th cycle (%) | Short circuit |
|---|---|---|---|---|---|---|
| A1 | 21.0 | 1.16 | 70 | 25 | 97.5 | None |
| A2 | 21.9 | 1.11 | 80 | 25 | 97.9 | None |
| A3 | 23.1 | 1.05 | 90 | 25 | 98.2 | None |
| A4 | 24.0 | 1.01 | 100 | 25 | 98.1 | None |
| A5 | 20.5 | 1.19 | 70 | 50 | 98.8 | None |
| A6 | 22.1 | 1.10 | 80 | 50 | 98.7 | None |
| A7 | 22.9 | 1.06 | 90 | 50 | 99.1 | None |
| A8 | 23.9 | 1.02 | 100 | 50 | 99.6 | None |
| A9 | 21.0 | 1.16 | 100 | 20 | 90.3 | None |
| B1 | 19.4 | 1.25 | 60 | 25 | — | 12th cycle |
| B2 | 18.2 | 1.33 | 50 | 25 | — | 5th cycle |
| B3 | 19.1 | 1.27 | 60 | 50 | — | 10th cycle |
| B4 | 17.5 | 1.39 | 50 | 50 | — | 2nd cycle |

As shown in Table 1, although the batteries (B1 to B4) of Comparative Examples 1 to 4 short-circuited before completion of 20 cycles, the batteries (A1 to A9) of Examples 1 to 9 did not short-circuit during the 20 cycles, and the capacity retention of the 20th cycle was higher than 90% in every battery. In the battery (A9) of Example 9, since the thickness of lithium metal of the negative electrode was 20 μm and was smaller than the thickness X of the deposited lithium metal, it was suggested that the ratio of the design capacity Cn of the negative electrode to the design capacity Cp of the positive electrode, $C_n/C_p$, was less than 1. It was therefore conceived that the capacity retention of the 20th cycle of the battery A9 decreased compared to the batteries (A1 to A8) of other Examples.

The results above demonstrate that excellent cycle characteristics can be obtained without causing short circuit by controlling the value X/Y to 1.00≤X/Y<1.20.

TABLE 2

| Battery | Y (μm) | X/Y | Positive electrode Li-extracted amount (%) | Negative electrode Rolled Li (μm) | Capacity retention of 20th cycle (%) | Short circuit |
|---|---|---|---|---|---|---|
| A10 | 15.1 | 1.16 | 70 | 25 | 98.3 | None |
| A11 | 16.2 | 1.08 | 80 | 25 | 98.1 | None |
| A12 | 17.1 | 1.02 | 90 | 25 | 98.7 | None |
| A13 | 17.3 | 1.01 | 100 | 25 | 98.5 | None |
| B5 | 14.3 | 1.22 | 60 | 25 | — | 8th cycle |

As shown in Table 2, the batteries (A10 to A13) of Examples 10 to 13 did not short-circuit during the 20 cycles, and the capacity retention of the 20th cycle was higher than 98% in every battery. In contrast, the battery (B5) of Comparative Example 5 short-circuited in the 8th cycle.

The results above demonstrate that excellent cycle characteristics can be obtained without causing short circuit by controlling the value X/Y to $1.00 \leq X/Y < 1.20$, even if the value Y is smaller than those in Examples 1 to 9.

The lithium metal secondary battery of the present disclosure has a large battery capacity and excellent cycle characteristics and therefore can be used in, for example, electronic devices, such as mobile phones, smart phones, and tablet terminals; electric vehicles including hybrids and plug-in hybrids; and household storage batteries combined with solar batteries.

What is claimed is:

1. A lithium metal secondary battery comprising:
   a positive electrode;
   a negative electrode;
   a separator disposed between the positive electrode and the negative electrode; and
   a nonaqueous electrolyte, wherein:
   the positive electrode includes a positive electrode active material that performs a lithium-ion insertion reaction during discharging and that performs a lithium-ion extraction reaction during charging,
   the negative electrode performs a reaction in which lithium metal is deposited during the charging and performs a reaction in which lithium metal is dissolved during the discharging,
   the positive electrode and the negative electrode are wound to form an electrode group,
   the positive and negative electrodes face each other with the separator between the positive and negative electrodes,
   the electrode group has a space for accommodating at least part of the nonaqueous electrolyte when fully discharged, and
   $1.01 \leq X/Y < 1.20$ is satisfied, where X is a calculated thickness of the lithium metal which is calculated from:
   X=design capacity per unit area of the positive electrode/ (theoretical capacity of the lithium metal×density of the lithium metal), and
   Y is a virtual thickness of the space when the space is assumed to be formed only between the negative electrode and the separator.

2. The lithium metal secondary battery according to claim 1, wherein the positive electrode active material has at least one crystal structure selected from the group consisting of a layered rock salt structure, a spinel structure, and an olivine structure.

3. The lithium metal secondary battery according to claim 1, wherein the negative electrode has design capacity $C_n$, the positive electrode has design capacity $C_p$, and the ratio $C_n/C_p$ satisfies $1.0 < C_n/C_p < 4.0$.

* * * * *